(12) United States Patent
Krack

(10) Patent No.: US 7,062,019 B2
(45) Date of Patent: Jun. 13, 2006

(54) METHOD OF PROVIDING SPEECH RECOGNITION FOR IVR AND VOICE MAIL SYSTEMS

(75) Inventor: Mike Krack, Los Altos, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 419 days.

(21) Appl. No.: 09/917,576

(22) Filed: Jul. 27, 2001

(65) Prior Publication Data

US 2003/0021394 A1 Jan. 30, 2003

(51) Int. Cl.
*H04M 1/64* (2006.01)

(52) U.S. Cl. ................. 379/88.04; 704/270.1

(58) Field of Classification Search .......... 379/88.01, 379/88.1, 10.01, 88.18, 88.02, 88.03, 88.04, 379/74, 75, 76, 77
See application file for complete search history.

(56) References Cited

U.S. PATENT DOCUMENTS

| | | | |
|---|---|---|---|
| 5,125,024 A | 6/1992 | Gokcen et al. | .......... 379/88 |
| 5,371,901 A | 12/1994 | Reed et al. | |
| 5,479,490 A * | 12/1995 | Nakashima | ............ 379/88.01 |
| 5,506,901 A | 4/1996 | Reeder | ............ 379/410 |
| 5,802,526 A * | 9/1998 | Fawcett et al. | ......... 379/88.18 |
| 6,366,879 B1 * | 4/2002 | Coxhead et al. | .......... 379/88.1 |
| 6,377,662 B1 * | 4/2002 | Hunt et al. | ............ 379/88.01 |
| 6,385,584 B1 * | 5/2002 | McAllister et al. | ...... 379/10.01 |
| 6,389,398 B1 * | 5/2002 | Lustgarten et al. | ...... 379/88.01 |
| 6,487,277 B1 * | 11/2002 | Beyda et al. | ............ 379/88.01 |
| 6,601,031 B1 * | 7/2003 | O'Brien | .................. 704/270.1 |
| 2002/0090066 A1 * | 7/2002 | Gupta et al. | ............ 379/88.03 |

OTHER PUBLICATIONS

Hester et al.; "The AT&T Multi-Mode Voice Systems—Full Spectrum Solutions for Speech Processing Applications"; Proceedings of the (Sep.) 1985 AVIOS Conference; 12 pages.

(Continued)

*Primary Examiner*—Fan Tsang
*Assistant Examiner*—Gerald Gauthier
(74) *Attorney, Agent, or Firm*—Sheridan Ross P.C.

(57) ABSTRACT

The present invention is directed to a speech enabling gateway system that can provide a speech recognition capability to signal-based adjunct processors, such as DTMF-based adjunct processors. The gateway, in one configuration, conferences two or more channels together and performs speech recognition on data streams carried by one or both of the channels. Spoken commands are mapped to appropriate signals for the signal-based adjunct processor.

42 Claims, 5 Drawing Sheets

OTHER PUBLICATIONS

Press Release entitled "Lucent Technologies adds easy-to-use speech recognition to its INTUITY (tm) AUDIX (r) multimedia messaging system"; Milpitas, CA; Sep. 27, 1999; 2 pages.

CTI News; "Lucent Voice Director Adds Speech Rec to Dialing"; Oct. 5, 1999; vol. 3, No. 20; 1 page.

"PhoneticOperator"; Internet Article found at http://www.phoneticsystems.com/phoperator.http, 3 pages.

'PhoneticAttendant'; Internet Article found at http://www.phoneticsystems.com/phattendant.http; 4 pages.

L.F. Larnel and J.L. Gauvain, Language Identification Using Phone-Based Acoustic Likelihoods, ICASSP-94, 4 pages.

John H.L. Hansen and Levent M. Arslan, *Foreign Accent Classificatino Using Source Generator Based Prosodic Features*, IEEE Proc, ICASSP, vol. 1, pp. 836-839, Detroit USA (May 1995).

Levent M. Arslan and John H.L. Hansen, *Language Accent Classification in American English*, Robust Speech Processing Laboratory, Duke University Department of Electrical Engineering, Durham, NC, Technical Report RSPL-96-7, revised Jan. 29, 1996.

Levent M. Arslan, *Foreign Accent Classification in American English*, Department of Electrical Computer Engineering, Duke University, Thesis, pp. 1-200 (1996).

\* cited by examiner

| | 400 | 404 | 408 | 412 |
|---|---|---|---|---|
| A | PLAY / REVIEW / LISTEN TO | NEW | MESSAGES | 11 |
| B | PLAY / REVIEW / LISTEN TO | SAVED | MESSAGES | 12 |
| C | DELETE / ERASE | MESSAGE | | 337 |
| D | SAVE | MESSAGE | | 339 |
| E | NEXT / SKIP | MESSAGE | | # |
| F | REPEAT / REPLAY | MESSAGE | | 334 |
| G | ENVELOPE | INFORMATION | | 335 |
| H | FORWARD | MESSAGE | | 336 |
| I | RECORD | a | REPLY | 338 |
| J | RECORD | a | NEW MESSAGE | 2 |
| K | | OPTIONS | | 0 |
| L | | MARK IT | URGENT | 2 |
| M | | | CONFIRMATION | 3 |
| N | | MARK IT | PRIVATE | 1 |
| O | | SEND | MESSAGE | # |
| P | MAIN MENU | | | 33# |
| Q | CANCEL / FINSHED | | | * |
| R | POUND | | | # |
| S | STAR | | | * |
| T | GOODBYE / HANG-UP / EXIT | | | *** |
| U | ANY-4-DIGIT NUMBER- i.e. MAILBOX OR EXT. | | | 4 DIGIT NUMBER |

…

METHOD OF PROVIDING SPEECH RECOGNITION FOR IVR AND VOICE MAIL SYSTEMS

FIELD OF THE INVENTION

The present invention relates generally to telecommunications switching systems and specifically to telecommunications switching systems equipped with adjunct processors.

BACKGROUND OF THE INVENTION

Adjunct processors are commonly used with telecommunications switching systems to provide features and other capabilities that are not available from the switching system itself. An illustrative example of an adjunct processor is a voice messaging system that interacts with callers to provide a voice message-delivery service between calling and called parties.

A conventional way for a person to interact with an adjunct processor such as a voice messaging system is through his or her telephone keypad, which responds to the person's button presses by generating dual-tone multi-frequency (DTMF also known as Touch-Tone) control signals and sending them to the adjunct processor. An unfortunate limitation of this user interface is that it requires the person to have a DTMF telephone. Consequently, the many persons who have traditional rotary-pulse telephones and/or desire the convenience of interactive voice responsive systems are excluded from obtaining the services of the adjunct processor.

A way to overcome this limitation is to equip the adjunct processor with a voice- or speech-recognition facility, which enables persons to interact with the adjunct processor through spoken commands. While such a facility may be built into newly-designed adjunct processors, it is often impractical, e.g., for cost reasons, to do so. And it is difficult to impossible to add such a facility to existing adjunct processors, because speech processing consumes large amounts of computing resources, which the adjunct processor normally cannot spare, because (particularly for older systems) the source code required to modify the processor may no longer be available, and/or because it is not practical or possible to add new boards to the processor. Hence, it is preferable to provide the voice- or speech-recognition facility as a separate unit—as an adjunct processor to the adjunct processor.

Voice- or speech-recognition units are normally configured to terminate all input signals, not to terminate some (e.g., control commands) and to pass through others (e.g., voice messages to be recorded). Consequently, without the use of additional circuits, a voice- or speech-recognition unit normally cannot be connected—either in series or in parallel—to the same switching system port as the adjunct processor which it is to serve. And while bridging, conferencing, or service observing arrangements (which can connect a plurality of terminals (e.g., telephone station sets or adjunct processors) in parallel to a single call) are known, they are not usable as conventionally implemented to connect a voice- or speech-recognition unit to the same call as an adjunct processor but at a different switching system port. This is because they normally feed to the receiver of the bridged, conferenced, or service-observing unit the combined output of all other units connected to the call. Consequently, they would combine both the caller's output signals and the adjunct processor's output signals on the same link or channel for input to the voice- or speech-recognition unit, making it impossible for this unit to determine the source of the input and hence to distinguish between the caller's control commands on the one hand and prompts and messages being played out by the adjunct processor on the other hand.

SUMMARY OF THE INVENTION

These and other needs are addressed by the various embodiments of the present invention. Generally, the architecture of the present invention provides a speech recognition front-end to signal-based telephone user interfaces (TUIs), such as a DTMF-based TUI, and/or as a stand-alone speech-enabled Interactive Voice Response (IVR) platform.

In one embodiment, an interactive voice response system for a telecommunications system, comprises:

(a) an adjunct processor that outputs an output data stream to user;

(b) a speech gateway enabling system comprising:

(i) a speech recognition engine operable to identify words in an input voice stream received from the user on a first communication path extending between the user and the speech gateway enabling system and (ii) a speech gateway controller operable (a) to transfer at least a portion of the input voice stream from the first communication path to a second communication path extending between the speech gateway enabling system to the adjunct processor and (b) to transfer the input voice stream from the first communication path to the speech recognition engine for processing. In one configuration, the speech enabling gateway controller is also operable (c) to transfer at least a portion of the output data stream from the second communication path to the first communication path. Having two distinct communication paths permits the system to recognize readily the source for any data received by the system. In other words, the system is able to distinguish readily between communications from the user or caller and from the adjunct processor.

The adjunct processor can be any voice- or multi-frequency signal-responsive processor. Examples include voice messaging systems, voice fax servers, IVR, and combinations thereof.

The speech recognition engine can be any suitable speech recognition software that is capable of identifying at least certain predetermined words or phrases, which vary by application. In one voice messaging configuration, for example, the predetermined words include "play", "delete", "save", "repeat", and the like. The speech enabling gateway system typically comprises grammar correlating a plurality of selected words with a corresponding plurality of DTMF codes (which are in the command set of the adjunct processor).

The speech gateway controller typically receives the pertinent DTMF code from the speech recognition engine and generates and/or transmits the appropriate DTMF codes on the second communication path to the adjunct processor. In one configuration, a switch symbol can be received from the speech recognition engine, which causes the controller to terminate providing data from the first communication path to the engine and start providing data from the second communication path to the engine or the controller to terminate providing data from the second communication path to the engine and start providing data from the first communication path to the engine.

The speech gateway enabling system can include other components. For example, the system can include a speech digitizer that converts the input voice stream from analog to digital form.

The first and second communication paths are typically configured or created by a switching system, such as a Private Branch Exchange or PBX or other type of telephony switch switching system. In one configuration, the switching system includes a plurality of communication ports and the first communication path extends between first and second communication ports of the switching system and the second communication path extends between different third and fourth communication ports of the switching system. The switching system essentially conferences or trombones the two paths together. The communication paths are each typically defined by one duplex or bi-directional channel or a plurality of uni-directional channels. The system is also typically connected in series or in-line between the caller and the adjunct processor.

In a second embodiment, a method of providing interactive voice response capability in a telecommunications system is provided that includes the steps of:

(a) directing to a speech recognition engine at least a portion of an input voice stream received from a user on a first communication path extending between the user and a first adjunct processor;

(b) detecting at least some of the words in the at least a portion of the input voice stream;

(c) transferring the input voice stream to a second communication path extending between the first adjunct processor and a second adjunct processor;

(d) comparing at least some of the detected words with a grammar, the grammar correlating a plurality of words with a corresponding plurality of DTMF codes, to identify corresponding DTMF codes for each of the at least some of the detected words; and (e) transmitting a DTMF signal corresponding to at least one identified DTMF code on a second communication path extending between the first adjunct processor and the second adjunct processor.

Typically, the directing and transferring steps occur substantially simultaneously or simultaneously.

The present invention can provide a number of advantages. First, the architecture can provide a universal speech-enabled TUI to any adjunct processor responsive to multi-frequency control signal, such as DTMF. The installation of the TUI typically requires no hardware or software changes to the adjunct processor or switch system. The adjunct processor continues to respond to DTMF digit input. The translation from spoken word to DTMF is performed inside the speech gateway enabling system, and the adjunct processor is unaware of how the DTMF was generated. Accordingly, the speech gateway enabling system works with any DTMF-based TUI. Second, the architecture is flexible. It can offer open connectivity to any speech recognition engine, whether now in existence or later developed. Third, in the event that a component in the gateway enabling system fails, the DTMF capability of the adjunct processor remains active. Hence, the controller's transfer of the data from the first to the second communication paths and from the second to the first communication paths will enable users to revert to DTMF codes to interface with the adjunct processor. Fourth, the gateway enabling system can be implemented with VoiceOverIP technology to provide a software only solution. Fifth, the gateway enabling system and/or a component(s) thereof can be shared by multiple remote units or adjunct processors, whether or not the processors are co-located. The gateway enabling system or a component(s) thereof can be provided at a physically separate location or even at an exchange of the Public Switch Telephone Network or PSTN or another network to which the switching center is connected. Sixth, the gateway enabling system can be configured to handle multiple users or callers at the same time.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Speech Enabling Gateway System

Figure 1:
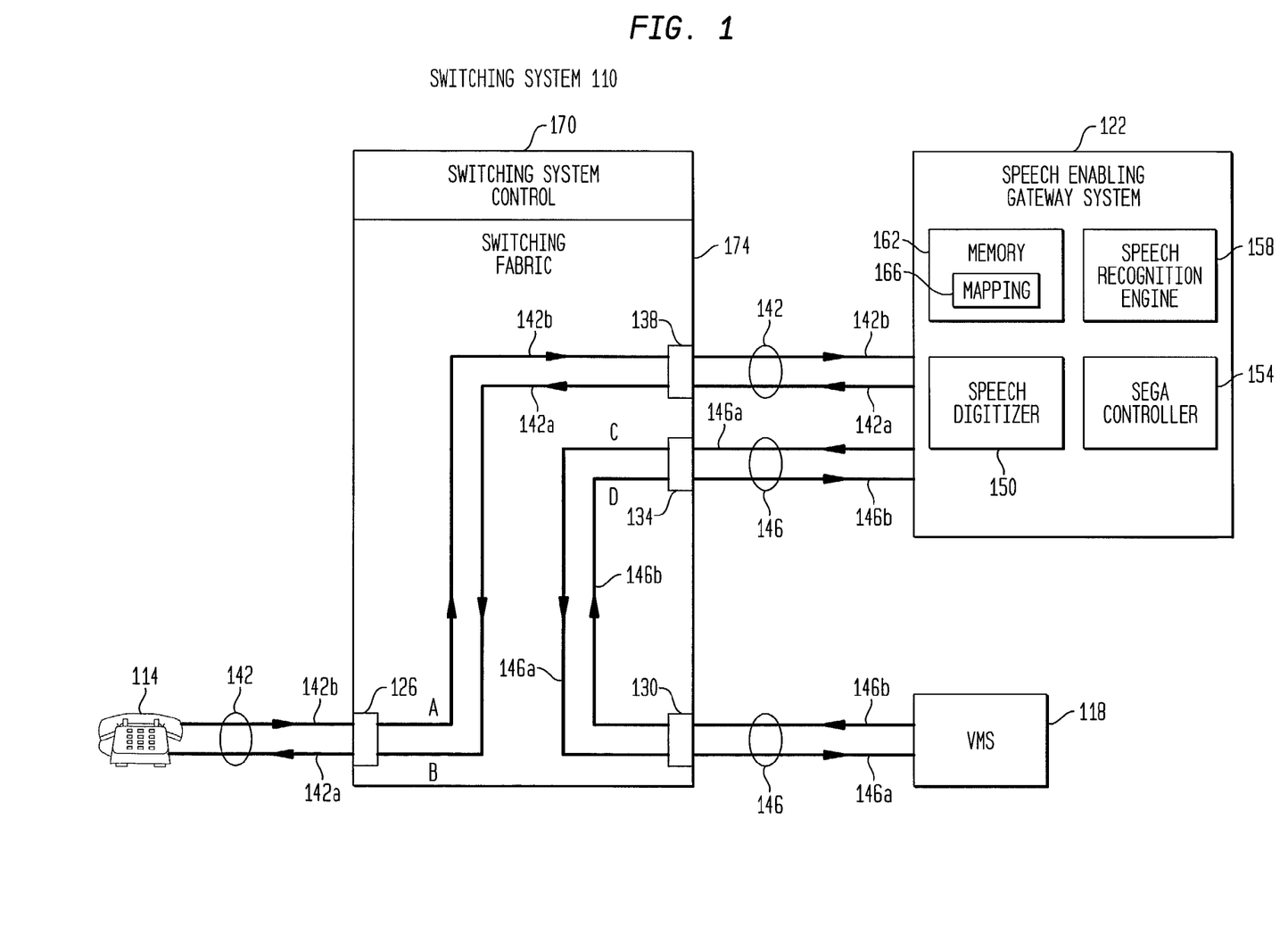
FIG. 1 is a block diagram of an all-digital telecommunications system that includes an illustrative embodiment of the invention.

FIG. 1 shows a rudimentary telecommunications system, comprising a switching system 110 that interconnects a plurality of terminals 114, 118, and 122. Terminals 122 and 118 are first and second adjunct processors, respectively. The first adjunct processor 122 is the speech enabling gateway (or SEGA) system. The second adjunct processor 118 is shown as a voice messaging system (VMS) but can be any type of adjunct processor responsive to signals such as DTMF-type signals or digits (e.g., voice fax server (such as Aria™, Serenade™, Intuity™, Overture™, and Unified Messenger™, all manufactured by Avaya Inc.), and DTMF-based IVR systems (such as Conversant™). Terminal 114 is shown as a telephone but can be any type of user communication device with a speech interface (e.g., a wireless phone, a personal computer, and a second VMS). For simplicity of illustration, only one of a plurality of telephones 114 is shown, and other facilities (e.g., trunks leading to other switching systems) are omitted. By way of example, switching system 10 may be an AT&T or Lucent Definity™ or Intuity™ private branch exchange (PBX), and VMS 118 may be an AT&T or Lucent Definity™ Audix™ or Legacy™ VMS. Each terminal 114, 118, and 122 is connected to a different associated at least one port 126, 130, 134, and 138, respectively, of switching system 110.

Each port of switching system 110 is a single administrable entity—an atomically-allocatable resource for purposes of providing communications services. The connections of terminals 114, 118, and 122 to the ports of a switching system 110, and any connections between the ports that are established by the switching system, define first and second bidirectional or duplex communication path 142 and 146. Each communication path 142 and 146 includes a pair of unidirectional channels 142a,b and 146a,b, respectively, that carry communications in opposite directions. As will be appreciated, the paths can also each be in the form of a single bi-directional channel. Thus, for example, a connection established by switching system 10 between telephone 114 and SEGA system 122 carries input voice streams A and B, and a connection between SEGA system 122 and VMS 118 carries data streams C and D.

Although FIG. 1 assumes that telephone 114 and the first communication path 142 are all digital, and therefore that streams A and B remain fully separated, flowing on separate channels, throughout the system of FIG. 1, it is to be understood that telephone 114 and all or a portion of the first communication path 142 can be configured by known techniques to carry analog information to inhibit phenomena such as crosstalk and feedback.

Switching system 10 further includes control for controlling operation of the switching system 110 and switching fabric 174 for configuring communication paths between ports (and therefore terminals) in response to control signals from the switching system control 170. Switching system control 170 and switching fabric 174 are conventional.

SEGA system 122 includes a speech digitizer 150 (which is not required when the voice stream A is already in digital form) for converting analog signals to digital signals, speech recognition engine or SRE 158 for identifying predetermined words in streams A and/or D and for mapping detected words to DTMF codes in the command set of the VMS, SEGA controller 154 for initiating the configuration of the first and second communication paths 142, 146 and for transferring voice stream A to the second communication path 146 (voice stream A forming at least part of data stream C) and to the speech recognition engine 158, for transferring data stream D to the first communication path 142 (data stream D forming at least part of voice stream B), for transferring data stream D to the speech recognition engine, and memory 162, and/or for playing identified DTMF codes on channel 146a as DTMF signals for control of VMS 118. Memory 162 contains mapping or grammar files 166 containing look-up tables correlating the identified words with corresponding DTMF codes (e.g., see FIG. 4 and discussion below). Speech digitizer 150 can be any suitable analog-to-digital converter, and speech recognition engine 158 can be any suitable speech recognition software. In one configuration, a common board is used to perform the digitization, recording, and playback operations. Such boards include the AG2000™ or AG400™ manufactured by Natural Microsystems.

Operation of the SEGA Controller

Figure 2A:
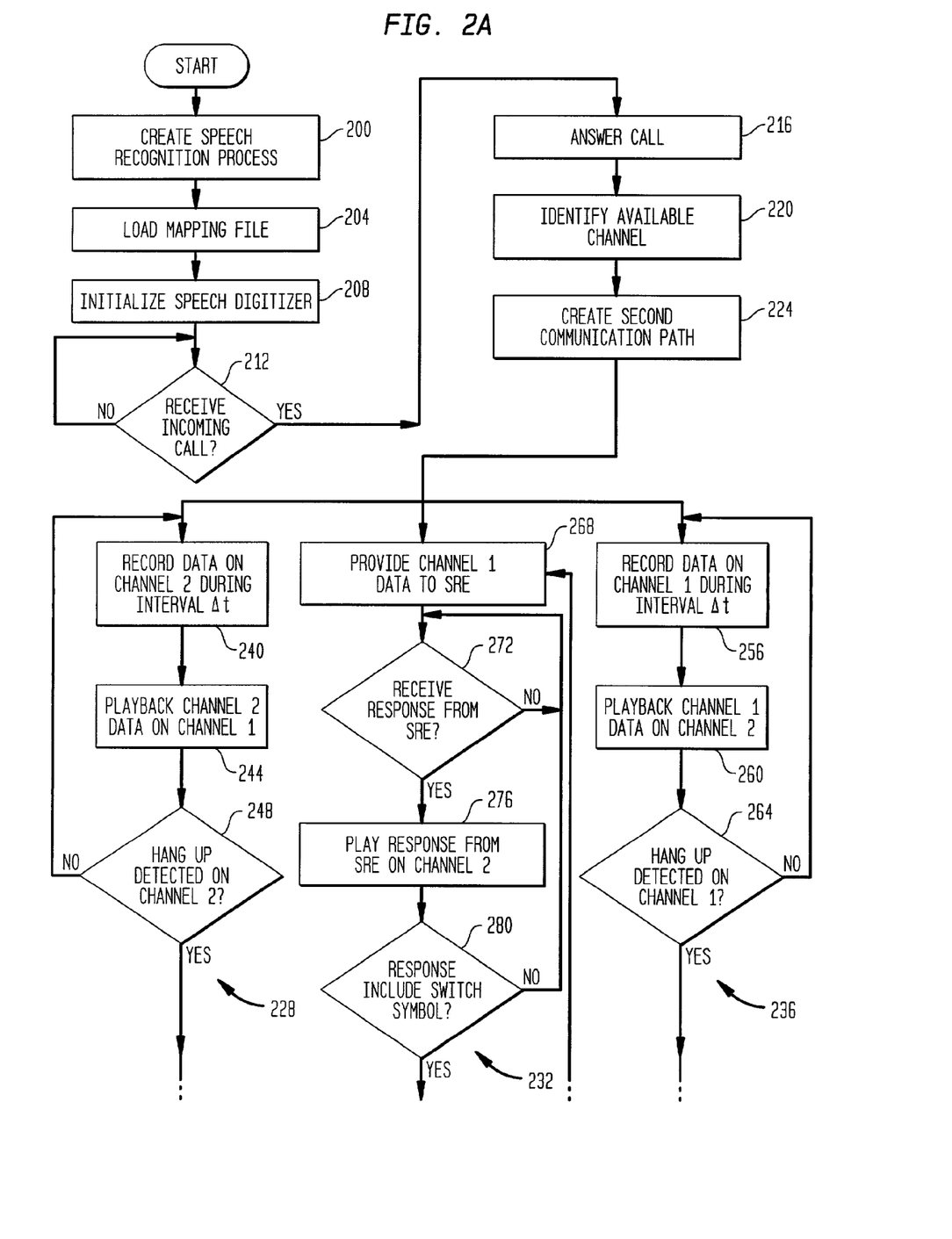
FIGS. 2A–B are flowcharts of one embodiment of a process for the operation of the SEGA controller of FIG. 1.
Figure 2B:
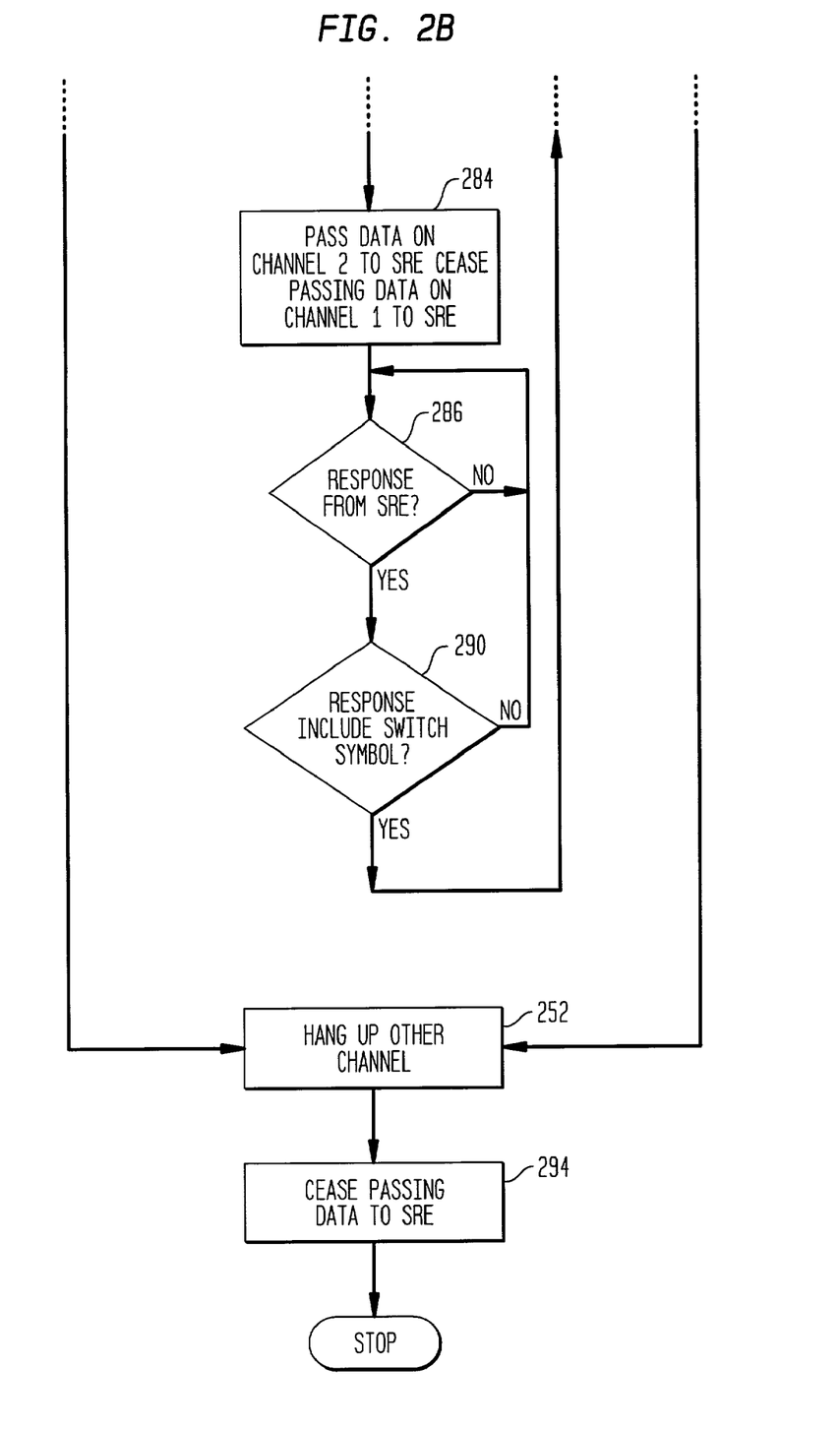

FIGS. 2A–B depict the operation of the SEGA controller 154. Upon booting, SEGA controller 154 creates the speech recognition process in step 200, loads the mapping file in step 204, and intializes the speech digitizer 208. After the initializing process is completed, SEGA controller 154 determines in step 212 whether an incoming call directed to the SEGA system 122 (by the switching system 110) has been received. The SEGA controller 154 repeats step 212 until an incoming call is detected. In the event that an incoming call is detected, the SEGA controller 154 answers the call in step 216 to complete the first communication path 142. In step 220, the SEGA controller 154 identifies an available channel(s) in the switching system 10 and in step 224 forwards signal(s) to the switching system 10 to connect the SEGA system 122 with the VMS 118 to form the second communication path 146. The first communication path is typically formed by a user of telephone 114 dialing a SEGA hunt group and/or a hunt group for VMS 118 which is redirected by switching system control 170 to the SEGA system 122. The second communication path is typically formed by the SEGA system 122 dialing a hunt group number of VMS 118 and/or by switching system control 170 automatically in response to the call to the SEGA system 122. The first and second communication paths are effectively conferenced together.

The SEGA controller performs each of the three loops 228, 232, and 236 at least substantially simultaneously.

In loop 228, the SEGA controller 154 transfers data on the second communication path to the first communication path. The SEGA controller 154 records data on the incoming channel 146b on the second communication path 146 during a predetermined time interval Δt (which is typically about 100 msec) in step 240 and plays back or transfers the recorded data on outgoing channel 142a of the first communication path 142 in step 244. As will be appreciated, the data can be transferred to the first communication path without having been saved to a file. The SEGA controller 154 determines in step 248 whether a hangup has occurred on either or both of channels 146a,b of the second communication path 146. If not, the SEGA controller 154 repeats steps 240 and 244 for a second block of information received from VMS 118 in the next Δt time interval. If so, the SEGA controller 154 in step 252 hangs up or disconnects the first communication path (or channels 142a,b).

In loop 236, the SEGA controller 154 transfers data on the first communication path to the second communication path. The SEGA controller records data on the incoming channel 142b on the first communication path 142 during the predetermined time interval Δt in step 256 and plays back or transfers the recorded data on outgoing channel 146a of the second communication path 146 in step 260. As will be appreciated, the data can be transferred to the second communication path without having been saved to a file. The SEGA controller 154 determines in step 264 whether a hangup has occurred on either or both of channels 142a,b of the first communication path 146. If not, the SEGA controller 154 repeats steps 256 and 260 for a second block of information received from telephone 114 in the next Δt time interval. If so, the SEGA controller 154 in step 252 hangs up or disconnects the second communication path (or channels 146a,b).

In loop 232, the SEGA controller 154 transfers data to SRE 158 and evaluates feedback from SRE 158. In step 268, SEGA controller 154 provides data received on incoming channel 142b on first communication path 142 to SRE 158, and in step 272 determines whether a response has been received from SRE 158 on this or previously transferred data. If no response has been received, the SEGA controller repeats step 272. If a response has been received, the SEGA controller in step 276 plays the DTMF digits corresponding to the DTMF codes received from the SRE 158 on the outgoing channel 146a of the second communication path 146. When the DTMF digits are played, the user is placed on hold (or the first communication path is muted). As will be appreciated, echo cancellation techniques can also be employed to remove the DTMF digits from the first communication path. Next, in step 280, the SEGA controller determines whether the SRE response includes a switch symbol. The switch symbol or tag is typically alphabetical (due to the numerical nature of DTMF digits) and commands the SEGA controller to cease passing data from incoming channel 142b to SRE and to start passing data from incoming channel 146b to SRE to identify another switch symbol. For example in a VMS, the word "record" (output by the user) could have a corresponding DTMF digit and switch symbol (such as a "$" sign) and the word "recording stopped" (output by the adjunct processor) could have a corresponding switch symbol (such as a "$$" sign).

Performing speech recognition on incoming channel 146*b* may be unnecessary if the VMS is disabled or recording is terminated by a DTMF digit. This is shown in step 284 in which data on the second communication path 146 is now passed to SRE 158 and data on the first communication path 142 is no longer passed to SRE 158. This prevents conflicting commands from being sent to the adjunct processor. In step 286, the SEGA controller determines if a response has been received from SRE 158. Step 286 is repeated until a response is received. When a response is received, the SEGA controller in step 290 determines if the response includes a switch symbol. If not, the controller returns to step 286. If so, the controller returns to step 268 and again provides data on channel 142*b* to SRE 158.

In either loop 228 or 236 when a hang up is detected and the other communication path is disconnected, the SEGA controller 154 in step 294 ceases passing data to SRE 158.

During the playback steps 244 and 260, echo cancellation is performed by known techniques to prevent the data previously received on the playback channel from being forwarded back to the source of the data. For example, when data is received on a first channel and played back onto a second channel, there is a chance that the data previously copied from the second channel and played on the first channel can get transmitted back to the user. Echo cancellation is performed on the second channel to remove any such data previously received on the second channel and vice versa.

Operation of the SRE

Figure 3:
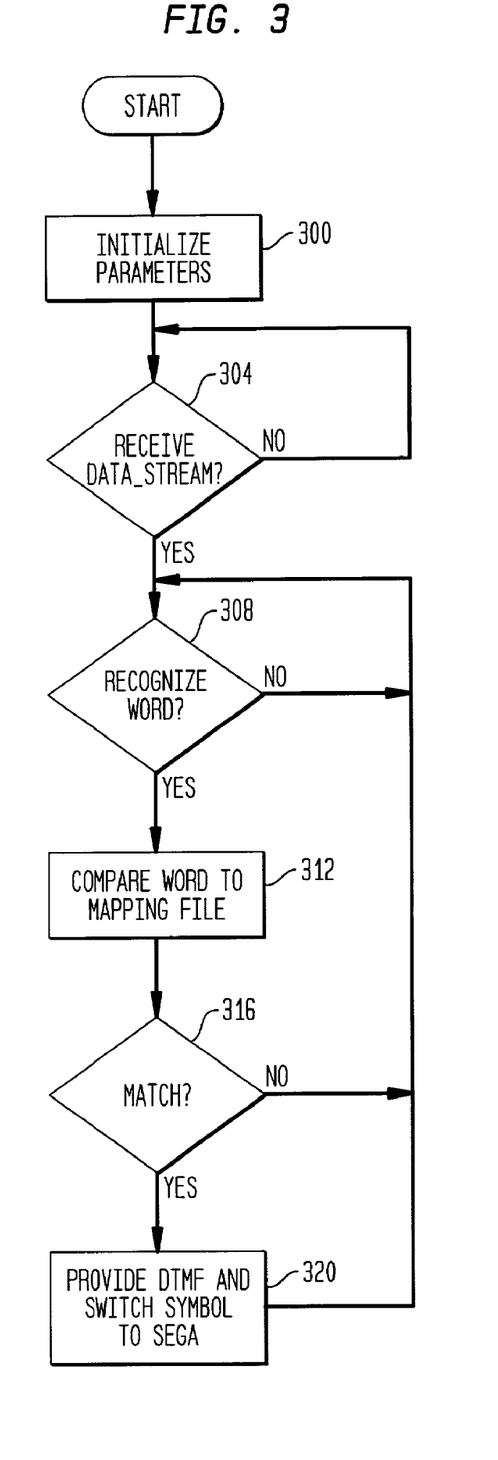
FIG. 3 is a flowchart of one embodiment of a process for the operation of the speech recognition engine of FIG. 1.

The operation of the SRE will now be discussed with reference to FIG. 3. Upon booting, SRE initializes parameters in step 300 and determines whether a data stream or block has been received from the SEGA controller in step 304. If a block has not been received, step 304 is repeated. If a block has been received, SRE determines in step 308 whether a word in the block has been identified. If not, step 308 is repeated until no data remains to be examined. If so, the identified word is compared in step 312 to the words in the mapping or grammar file 166 and in step 316 if a match is found the corresponding DTMF code and/or switch symbol is provided to the SEGA controller in step 320. If not match is found or after any corresponding DTMF code is provided to the SEGA controller, SRE returns to step 308.

Figure 4:
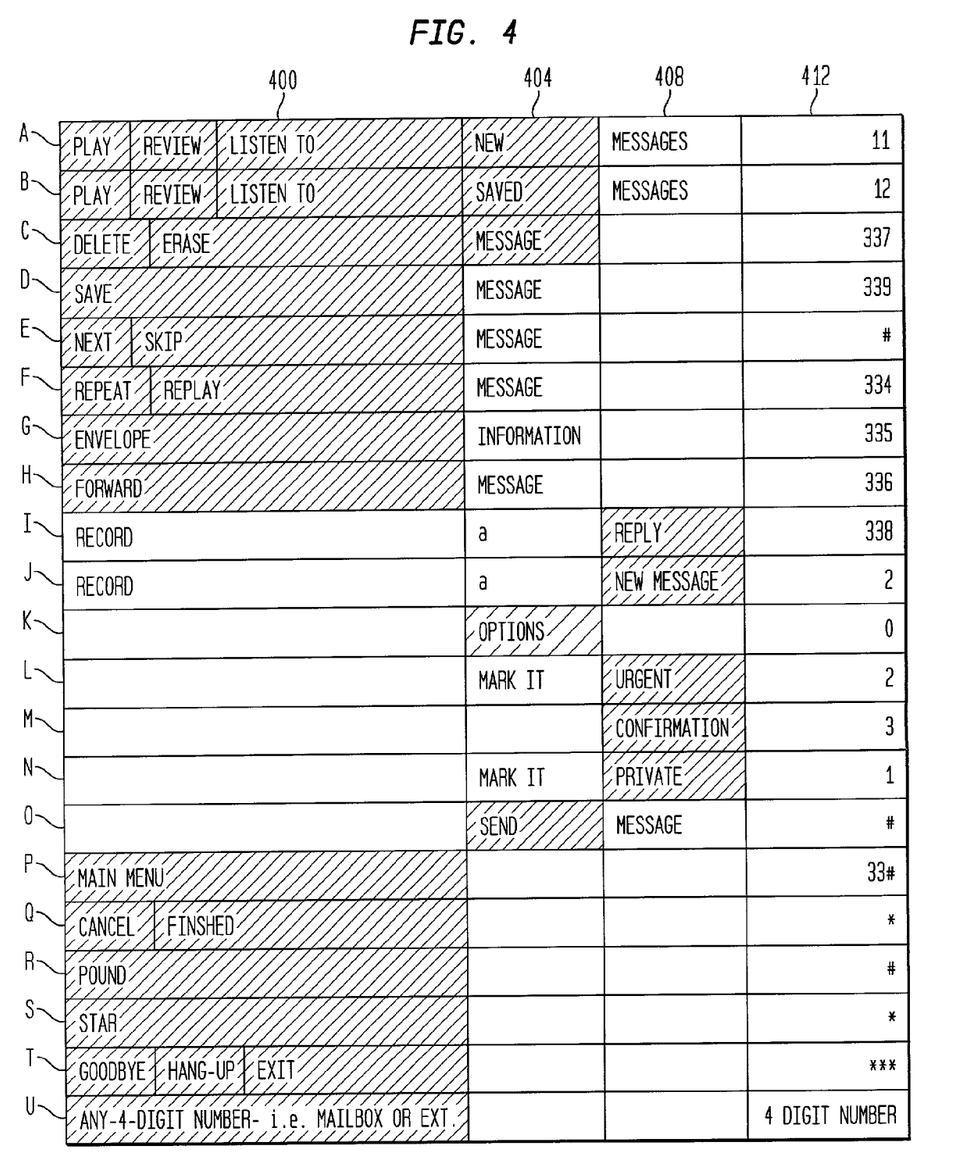
FIG. 4 is a grammar table according to one embodiment of the present invention.

As shown in FIG. 4, the grammar used by the system defines the mapping between spoken command and DTMF digit(s). FIG. 4 is, of course, one of many possible configurations of the grammar. The table includes columns 400, 404,408 and 412 and rows A–U. Referring to FIG. 4, the commands in boxes 400A, 404A, 400B, 404B, 400C, 404C, 400D, 400E, 400F, 400G, 400H, 408I,408J, 404K, 408L, 408M, 408N, 404O,400P, 400Q, 400R, 400S, 400T, AND 400U are mandatory while the commands in boxes 408A, 408B, 404D, 404E, 404F, 404G, 404H, 400I, 404I, 400J, 404J, 404L, 404N, AND 408O are optional. The "/" in the command boxes refers to the alternative. The corresponding DTMF codes are listed in column 412. By way of illustration, saying the word "play" or "review" or "listen to" (box 400A) and "new" (box 404A) will cause a DTMF digit "11" to be generated. This is true whether or not the word "messages" in box 408A is spoken by the user. Box 400U refers to the four digit password for the mailbox which is spoken by the user. The spoken numbers will be recognized by the SRE and the resulting DTMF digits generated by those numbers sent to the VMS.

A number of variations and modifications of the invention can be used. It would be possible to provide for some features of the invention without providing others. For example in one alternative embodiment, another component of the speech gateway enabling system (other than SRE) can perform the mapping function. In another alternative embodiment, the order of the steps is reversed, one or more of the steps are performed by different components, or one or more of the components are combined or split into separate components.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An interactive voice response system, comprising:
   an adjunct processor that outputs an output data stream to a user; and
   a speech gateway enabling system comprising:
   a speech recognition engine operable to identify words in an input voice stream received from the user on a first communication path extending between the user and the speech gateway enabling system and
   a speech gateway controller operable (a) to transfer at least a portion of the input voice streams, received from the users, from the first communication path to a second communication path extending between the speech gateway enabling system to the adjunct processor and (b) to transfer the at least a portion of the input voice stream from the first communication path to the speech recognition engine for processing.

2. The interactive voice response system of claim 1, wherein the speech gateway enabling system comprises a speech digitizer that converts the input voice stream from analog to digital form and the first and second communication paths are tromboned together.

3. The interactive voice response system of claim 1, wherein the first and second communication paths are configured by a switching system and the speech gateway controller is further operable to generate and transmit a command signal to the adjunct processor based on words identified by the speech recognition engine.

4. The interactive voice response system of claim 3, wherein the command signal is a DTMF code and the speech enabling gateway system comprises grammar correlating a plurality of words with a corresponding plurality of DTMF codes in the command set of the adjunct processor.

5. The interactive voice response system of claim 3, wherein the switching system comprises a plurality of communication ports and the first communication path extends between first and second communication ports of the switching system and the second communication path extends between different third and fourth communication ports of the switching system.

6. The interactive voice response system of claim 1, wherein the speech gateway controller performs operation (b) in a first operational mode and wherein the speech enabling gateway controller is also operable (c) to transfer at least a portion of the output data stream from the second communication path to the first communication path and (d), in a second operational mode, to transfer the at least a portion of the output data stream from the second communication path to the speech recognition engine for processing.

7. A method, comprising:
(a) directing to a speech recognition engine at least a portion of an input voice stream received from a user on a first communication path extending between the user and a first adjunct processor;
(b) detecting, with the speech recognition engine, at least some of the words in the at least a portion of the input voice stream;
(c) transferring the input voice stream from the first communication path to a second communication path extending between the first adjunct processor and a second adjunct processor;
(d) comparing at least some of the detected words with a grammar, the grammar correlating a plurality of words with a corresponding plurality of command codes, to identify corresponding command codes for each of the at least some of the detected words; and
(e) transmitting a command signal corresponding to at least one identified command code to the second adjunct processor on the second communication path.

8. The method of claim 7, wherein the directing and transferring steps occur at least substantially simultaneously.

9. The method of claim 7, wherein the grammar further includes at least one switch symbol for at least one of enabling and disabling the directing step (a).

10. The method of claim 7, further comprising:
(f) converting the input voice stream from an analog form to a digital form.

11. The method of claim 7, further comprising:
(f) configuring the first communication path for a first communication session initiated by the user with the first adjunct processor; and
(g) thereafter configuring the second communication path for a second communication session, initiated by the first adjunct processor, between the first and second adjunct processors.

12. The method of claim 7, further comprising:
(f) transferring an output data stream from the second communication path to the first communication path, the output data stream being received from the second adjunct processor.

13. The method of claim 12, wherein transferring steps(c) and (f) occur at least substantially simultaneously.

14. The method of claim 7, further comprising:
(f) muting the first communication path when the transmitting step (e) is performed.

15. The method of claim 7, further comprising:
(f) determining if the output from the speech recognition engine includes a switch symbol; and
(g) when the output includes a switch symbol, at least one of enabling or disabling the directing step (a).

16. The method of claim 7, further comprising:
(f) determining if one of the first and second communication paths has been disconnected; and
(g) when one of the first and second communication paths has been disconnected, disconnecting the other of the first and second communication paths.

17. A system, comprising:
first and second adjunct processors;
a speech recognition engine that detects at least some words in an input voice stream received from a user on a first communication path extending between the user and the first adjunct processor;
comparing means for comparing at least some of the detected words with a grammar, the grammar correlating a plurality of words with a corresponding plurality of DTMF codes, to identify corresponding DTMF codes for each of the at least some of the detected words;
directing means for directing to the speech recognition engine at least a portion of the input voice stream received from the user on the first communication path;
transferring means for transferring the at least a portion of the input voice stream received from the first communication path to a second communication path extending between the first adjunct processor and the second adjunct processor; and
transmitting means for transmitting a DTMF signal corresponding to at least one identified DTMF code on the second communication path.

18. The system of claim 17, wherein the grammar further includes at least one switch symbol for at least one of enabling and disabling the directing means.

19. The system of claim 17, further comprising:
converting means for converting the input voice stream from an analog form to a digital form.

20. The system of claim 17, further comprising:
configuring means for configuring the first communication path for a first communication session initiated by the user with the first adjunct processor and thereafter configuring the second communication path for a second communication session, initiated by the first adjunct processor, between the first and second adjunct processors.

21. The system of claim 17, further comprising:
transferring means for transferring an output data stream from the second communication path to the first communication path.

22. The system of claim 17, further comprising:
muting means for muting the first communication path when the transmitting means transmits DTMF signals.

23. The system of claim 17, further comprising:
determining means for determining if the output from the speech recognition engine includes a switch symbol; and
when the output includes a switch symbol, means for at least one of enabling or disabling the directing means.

24. The system of claim 17, further comprising:
means for determining if one of the first and second communication paths has been disconnected; and when one of the first and second communication paths has been disconnected, means for disconnecting the other of the first and second communication paths.

25. The interactive voice response system of claim 6, wherein the first operational mode is performed in response to a command signal from the user and the second operational mode is performed in response to a command signal from the adjunct processor.

26. The interactive voice response system of claim 3, wherein the speech gateway controller is operable to place the user on hold while the command codes are transmitted to the adjunct processor.

27. The method of claim 7, wherein the plurality of command codes are DTMF codes and the command signal is a DTMF signal.

28. The method of claim 12, further comprising:
(g) directing to the speech recognition engine at least a portion of the output data stream received from the second adjunct processor on the second communication path extending between the first and second adjunct processors;
(h) determining when the output data stream includes a switch symbol;
(i) when the output data stream includes a switch symbol, directing step (g) is performed and, when the input voice stream includes a switch symbol, directing step (a) is performed.

29. A method, comprising:
(a) directing to a speech recognition engine at least a portion of an output data stream received from a second adjunct processor on a second communication path extending between the second adjunct processor and a first adjunct processor;
(b) detecting, with the speech recognition engine, at least some of the words in the at least a portion of the output data stream received from the second adjunct processor;
(c) transferring the at least a portion of an output data stream received from the second adjunct processor to a first communication path extending between the user and the first adjunct processor;
(d) comparing at least some of the detected words with at least one command signal; and
(e) when the output data stream includes a command signal, terminating the directing step.

30. The method of claim 29, further comprising:
(f) directing to the speech recognition engine at least a portion of an input voice stream received from a user on the first communication path extending;
(g) detecting, with the speech recognition engine, at least some of the words in the at least a portion of the input voice stream;
(h) transferring the input voice stream to the second communication path;
(i) comparing at least some of the detected words with a grammar, the grammar correlating a plurality of words with a corresponding plurality of command codes, to identify corresponding command codes for each of the at least some of the detected words; and
(j) transmitting a command signal corresponding to at least one identified command code on the second communication path.

31. The method of claim 29, wherein the directing and transferring steps occur at least substantially simultaneously.

32. The method of claim 30, wherein the grammar further includes at least one switch symbol for at least one of enabling and disabling the directing steps (a) and (f).

33. The method of claim 30, further comprising:
(k) converting the input voice stream from an analog form to a digital form.

34. The method of claim 30, further comprising:
(k) configuring the first communication path for a first communication session initiated by the user with the first adjunct processor; and
(l) thereafter configuring the second communication path for a second communication session, initiated by the first adjunct processor, between the first and second adjunct processors.

35. The method of claim 29, wherein transferring step (c) and the directing step (a) occur at least substantially simultaneously.

36. The method of claim 30, wherein the directing steps (a) and (f) occur at different times and the transferring steps (c) and (h) occur at least substantially simultaneously.

37. The method of claim 30, further comprising:
(f) muting the first communication path when the transmitting step (j) is performed.

38. The method of claim 30, further comprising:
(k) determining when the at least a portion of the input voice stream includes a switch symbol; and
(l) when the at least a portion of the input voice stream includes a switch symbol, at least one of enabling or disabling the directing step (f).

39. The method of claim 30, further comprising:
(f) determining when one of the first and second communication paths has been disconnected; and
(g) when one of the first and second communication paths has been disconnected, disconnecting the other of the first and second communication paths.

40. The method of claim 28, wherein the directing steps (a) and (g) occur at different times and the transferring steps (c) and (f) occur at least substantially simultaneously.

41. The system of claim 17, wherein the directing and transferring operations occur simultaneously.

42. The method of claim 30, wherein directing step (f) and transferring step (h) occur simultaneously.

* * * * *